(12) United States Patent
Miller (10) Patent No.: US 8,091,947 B1
(45) Date of Patent: Jan. 10, 2012

(54) DISPOSABLE CAR COVER

(76) Inventor: Dennis L. Miller, Bettendorf, IA (US)

( * ) Notice: Subject to any disclaimer, the term of this patent is extended or adjusted under 35 U.S.C. 154(b) by 0 days.

(21) Appl. No.: 12/987,237

(22) Filed: Jan. 10, 2011

Related U.S. Application Data (63) Continuation of application No. 12/726,983, filed on Mar. 18, 2010, now abandoned, which is a continuation of application No. 12/039,734, filed on Feb. 28, 2008, now abandoned.

(60) Provisional application No. 60/903,913, filed on Feb. 28, 2007.

(51) Int. Cl.
*B60J 9/00* (2006.01)
(52) U.S. Cl. ................................. 296/136.1
(58) Field of Classification Search ............ 296/95.1, 296/136.1
See application file for complete search history.

(56) References Cited

U.S. PATENT DOCUMENTS

| | | | |
|---|---|---|---|
| 2002/0007888 A1* | 1/2002 | Gregorek | 296/136 |
| 2005/0151391 A1* | 7/2005 | Bryd | 296/136.1 |
| 2006/0207712 A1* | 9/2006 | Toussant et al. | 156/69 |

* cited by examiner

*Primary Examiner* — Lori Lyjak
(74) *Attorney, Agent, or Firm* — Hamilton IP Law, PC.; Jay R. Hamilton; Charles A. Damschen (57) ABSTRACT

A disposal automobile cover for preventing foreign substances, dust and water from contacting an automobile disclosed and claimed. A disposable automobile cover adapted to be expanded between first and second positions, the cover comprising a planar top wall having an ovate perimeter; a planar side wall connected to the ovate perimeter at a first edge; and an elastic strip operatively associated with the side wall at a second edge thereof, the side wall being parallel to the top wall when in the first position, the side wall being transverse to the top wall when in the second position.

5 Claims, 6 Drawing Sheets

DISPOSABLE CAR COVER

CROSS REFERENCE TO RELATED APPLICATIONS

This application claims priority from and is a continuation of U.S. patent application Ser. No. 12/726,983 filed Mar. 18, 2010 now abandoned, which was a continuation of and claimed priority from U.S. patent application Ser. No. 12/039,734 filed Feb. 28, 2008 now abandoned, which claimed priority from provisional US Pat. App. Ser. No. 60,903,913 filed on Feb. 28, 2007, all of which are incorporated by reference herein in their entireties.

FIELD OF THE DISCLOSURE

The present disclosure generally relates to automobile covers. More particularly, the present disclosure relates to disposable automobile covers.

STATEMENT REGARDING FEDERALLY SPONSORED RESEARCH OR DEVELOPMENT

No federal funds were used to develop or create the invention disclosed and described in the patent application.

REFERENCE TO SEQUENCE LISTING, A TABLE, OR A COMPUTER PROGRAM LISTING COMPACT DISK APPENDIX

Not Applicable.

BACKGROUND OF THE INVENTION

U.S. Pat. No. 6,793,090 issued to Ackerman et al. for "Elastic Container Cover and Method for Manufacturing" teaches and claims an ovate-shaped container cover includes one layer of cover material that substantially covers a container, while a second layer of cover material adapted with an elastic border for gripping the walls of a container is substantially adjacent to the walls of the container. The container cover, when placed atop a container, is capable of forming a dome. The preceding patent is incorporated by reference herein.

U.S. Pat. No. 7,051,895 issued to Toussant et al. for "Container Covering System" teaches and claims a container covering system comprising a flexible film cover including an elastic peripheral portion. The film cover forms a seal around a container on which the covering system is placed. U.S. Pat. No. 6,276,551 issued to Miller, II for "Flexible cap for various drink containers" claims a novel drink cap for preventing foreign substances from entering an opening of a beverage container, the drink cap comprising at least one flexible non-wetting sheet that has an outer surface, an inner surface, an edge portion located at the outermost periphery of the flexible sheet, a skirt portion located adjacent to the edge portion, an elastic periphery region located adjacent to the skirt portion, and a central web portion, whereby the central web portion of the inner surface of the at least one flexible sheet covers the opening of the beverage container. The preceding patent is incorporated by reference herein.

U.S. Pat. No. 6,099,067 issued to Butterworth for a "Vehicle transport cover" discloses and claims a vehicle transport cover that protectively overlays the painted exterior surfaces of a vehicle. The cover includes a base sheet made of a moisture-resistant material that overlays the vehicle. An elastic strip that circumferentially extends along the vehicle encircling bottom edge of the base sheet holds the vehicle cover in place and ensures a tight fit over the vehicle. Openings provided in the base sheet and which overlay all of the vehicle windows are covered by transparent window sheets that promote driver visibility. A zippered slit is also provided in the cover along the base sheet region which is aligned over the driver-side door to allow easy access to and from the driver seat when the cover is arranged over the vehicle. The preceding patent is incorporated by reference herein.

U.S. Pat. No. 7,100,965 issued to Stover for a "Multi-section land vehicle cover" discloses and claims a cover having a plurality of sections that can be attached to a land vehicle using anchor straps. The sections of the cover are attached to each other using connecting straps. The cover can be used when the land vehicle is in use. The preceding patent is incorporated by reference herein.

Automobile covers capable of covering automobiles of various sizes and shapes have been in use for many years. The prior art, however, has not delivered a solution to the market which is easy to use, inexpensive to purchase and compact when not in use or while packaged. There exists a need a disposable automobile cover which when not in use may be stored in the glove box of the automobile. There exists a need for a disposable automobile cover which envelopes the automobile in low cost readily available plastic material.

SUMMARY OF THE INVENTION

In an embodiment of the invention, an automobile covering system comprises a flexible film cover including an elastic peripheral portion. The film cover is configured to form a seal around the automobile on which the covering system is placed. The automobile covering system as described is preferably disposable and is produced with a dimension of thirteen feet by eighteen feet. Generally, it has an oval type shape. The thickness of the film, without limitation, is preferably 0.5 millimeters to 0.70 millimeters thick to reduce weight and bulk and encourage disposability. The cover protects against paint overspray, chemicals, sawdust, sprays, paint, rain and dirt.

In another embodiment of the invention, an automobile covering system comprises an automobile body and a flexible sheet or film cover. The flexible sheet or film cover has an elastic peripheral portion and the flexible sheet or film cover is configured to seal the cover to the automobile body when the cover is placed on the automobile body. The automobile covering systems and methods of the present invention are advantageous in that they may be used with a variety of different sized automobiles to provide an improved seal therewith.

In another embodiment of the present disclosure, a flexible sheet may be constructed from a flexible non-wetting material such as a combination of rubber and polyvinylchloride wherein the aforesaid material are sanitized to not mar or contaminate the automobile surface. The elastic periphery region is constructed from an elastic cord secured to the flexible sheet by adhesive, heat bonding, or other like methods of attachment. Attaching an elastic cord by heat bonding is sufficiently set forth by U.S. Pat. No. 4,691,390 issued to McKeown. An alternate construction of the automobile covering can be prepared by known techniques such as set forth in U.S. Pat. No. 4,846,827 issued to Sallee et al. and assigned to the Kimberly-Clark Corporation.

Essentially, to economically and feasibly produce disposable automobile covers they must be manufactured at high production rates using techniques such as invoking a "shirr" (an elasticized portion embedded and inherent therein the periphery of the flexible sheet) upon the flexible sheet. Yet another alternate construction includes the flexible sheet having two connected layers of which a first layer (not shown) provides the inner surface and comprises a plastic sheet and a second layer (not shown) provides the outer surface and comprises a decorative paper sheet. These and other aspects and features of the disclosure will become more apparent from the following detailed description when taken in conjunction with the accompanying drawings.

Referring now to the drawings and photos, and with specific reference to FIGS. 1-6, an automobile cover constructed in accordance with the present disclosure is generally referred to by reference numeral 10. Automobile covers 10 of the present disclosure can be used for covering automobiles 1. It is to be understood that the automobile cover 10 can be used for transport, inclement weather and as a dust cover during body or paint work in a shop.

The automobile cover can be constructed from a variety of materials such as any flexible plastic, cloth, rubber, paper, foil or the like. In an exemplary embodiment of the invention, the cover is constructed from a single piece of translucent or preferably transparent thin-film material such as, but not limited to, a polymer selected from the group consisting of polyethylenes (PE), polypropylenes (PP), polystyrenes (PS), polyvinyl chlorides (PVC), polyvinylidene chlorides (PVDC), polyvinyl acetates (PVAC), polyamides, including nylons, polyesters and mixtures thereof. Such a material provides a cover with the flexibility and strength to cover and contain a variety of different sized containers. The translucent or transparent nature of the automobile cover is advantageous to allow the vehicle to be visible without opening the automobile covering system, but is not required. The preferred material of construction should be selected for water and dust resistance, relative low weight and disposability.

Figure 1:
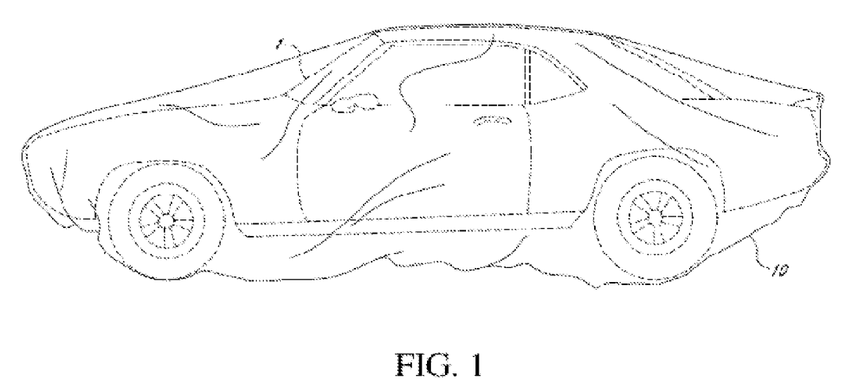
FIG. 1 illustrates one embodiment of the automobile covering system of the present art as applied to a vehicle.
Figure 2:
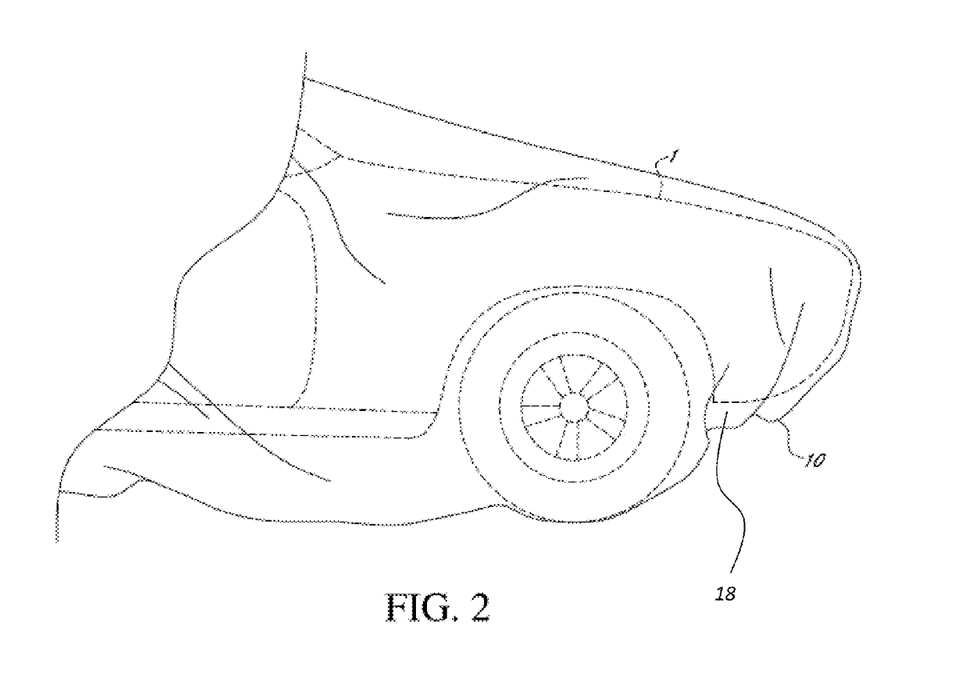
FIG. 2 illustrates a close-up side view of the automobile covering system as applied to a vehicle.

FIG. 1 illustrates one embodiment of the automobile covering system of the present art. The cover comprises an elastic peripheral portion 3 and in one embodiment of the invention, a portion of the cover 10 is configured to contact and provide a "seal" around an automobile when the cover is placed on the automobile to cover it. As used herein, the term "seal" or "sealing" means that the contact provided between an automobile cover 10 and an automobile 1 is substantially air and/or liquid impervious. For example, the contact provided between an automobile cover 10 and an automobile 1 should be sufficient to prevent significant liquid ingress during inclement weather.

In another embodiment of the invention, the elastic peripheral portion 3 of the cover 10 is configured to contact and provide a seal around an automobile 1 when the automobile cover is placed on the automobile. While in both embodiments it is desirable for the seal to form immediately, in some cases it may be acceptable for the seal to form over time such as a seal that results from a gradual flow of sealing or gasketing material. Such a seal can be formed by any variety of "adhesive elements". As used herein, the term "adhesive element(s)" means any composition, coating, material or the like capable of providing a seal such as, but not limited to glue, tape, double sided tape or gasketing material such as a conformable and/or compressible gasketing material.

Figure 4:
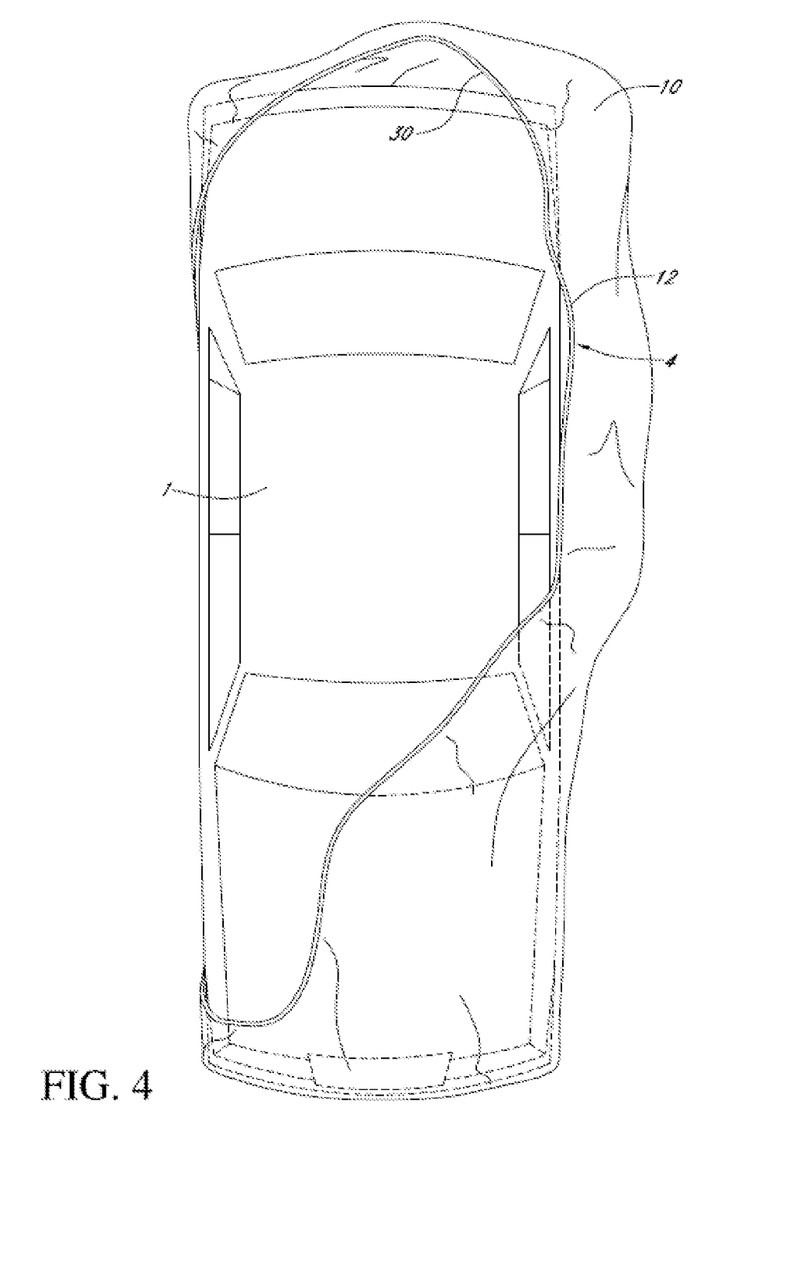
FIG. 4 illustrates a top view of the covering system being applied to the automobile.
Figure 5:
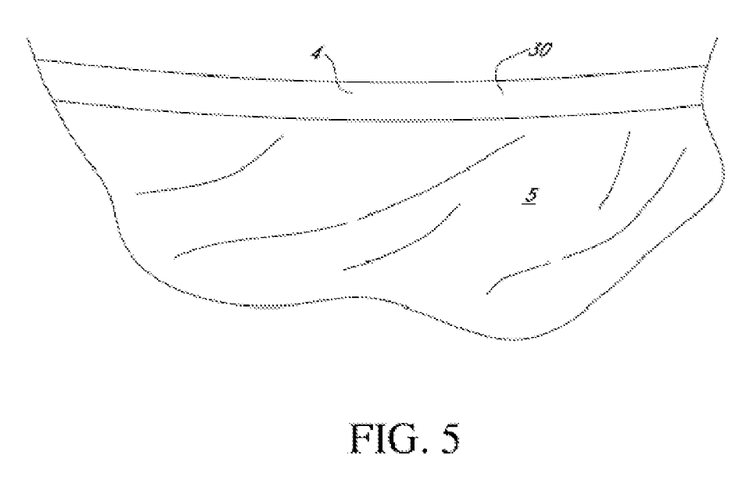
FIG. 5 illustrates the elastic portion of the covering system in an "un-stretched" state.
Figure 6:
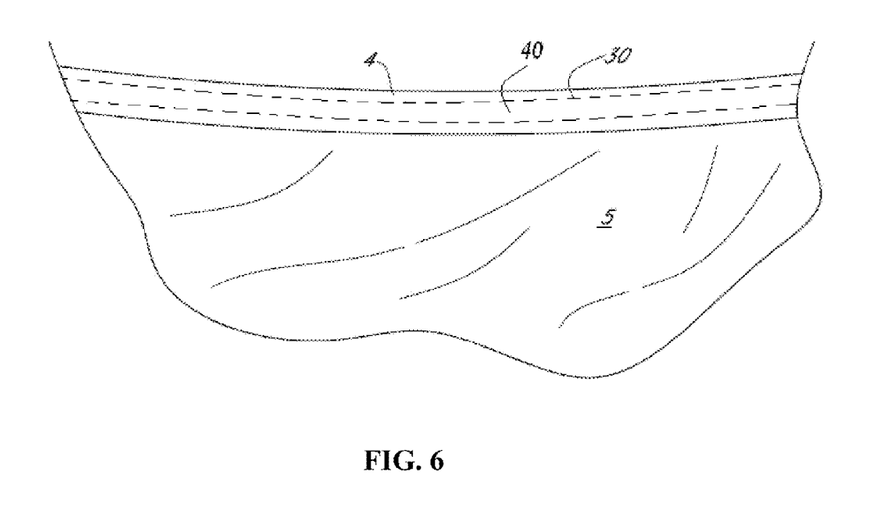
FIG. 6 illustrates the elastic portion of the covering system in a "stretched" state.

In an exemplary embodiment of the invention, the elastic peripheral portion 3 comprises an elastic edge such as an elastic band 4, which has elastic properties including the ability to stretch and relax. FIG. 4 depicts the automobile cover 10 in a relaxed state wherein the elastic peripheral portion 3 is unstretched. In contrast, FIG. 5 depicts the cover 10 in an unrelaxed state wherein the elastic peripheral portion 3 is stretched so that the automobile cover 10 will fit over a variety of different sized automobiles and wherein the elastic peripheral portion 3 will provide contact and preferably seal around substantially an entire outer surface of the automobile 10. While an air and/or liquid tight seal is preferred, there may be occasions when a user desires the enclosed automobile to be ventilated. This may be accomplished in any number of ways including puncturing the film 5 and/or interrupting the seal formed between the cover 10 and the automobile 1.

In a non-limiting embodiment of the invention, the cover 10, or a portion of the cover, is configured to provide a seal around an automobile on which the covering system is placed. In this embodiment, the cover may comprise an adhesive element, such as an adhesive glue coating that allows a portion of the cover to seal the container. Nonetheless, in an exemplary embodiment of the invention, it is the elastic peripheral portion 3 of the cover 10 that comprises the adhesive element for providing the seal around the vehicle on which the covering system is placed. In other words, the elastic peripheral portion 3 of a cover 10 is configured to form a seal around an automobile 1 to prevent air and/or liquid from penetrating the automobile. For example, it is contemplated an adhesive element of an elastic peripheral portion 3 may comprise an adhesive coating, or some other application or attachment of an adhesive to the elastic peripheral portion 3. The cover 10 or the elastic peripheral portion 3 of the cover having an adhesive element may be formulated to be releaseably resealable to an automobile. The term "releasably resealable" includes the meaning that a cover 10 might be capable of a plurality of uses on the same automobile or on a different automobile having a different shape and/or different material characteristics.

| DETAILED DESCRIPTION - LISTING OF ELEMENTS | |
|---|---|
| Element Description | Element Number |
| Automobile | 1 |
| Peripheral portion | 3 |
| Elastic band | 4 |
| Film | 5 |
| Automobile cover | 10 |
| Sealing portion | 18 |
| Adhesive element | 30 |
| Protective coating | 40 |

Figure 3:
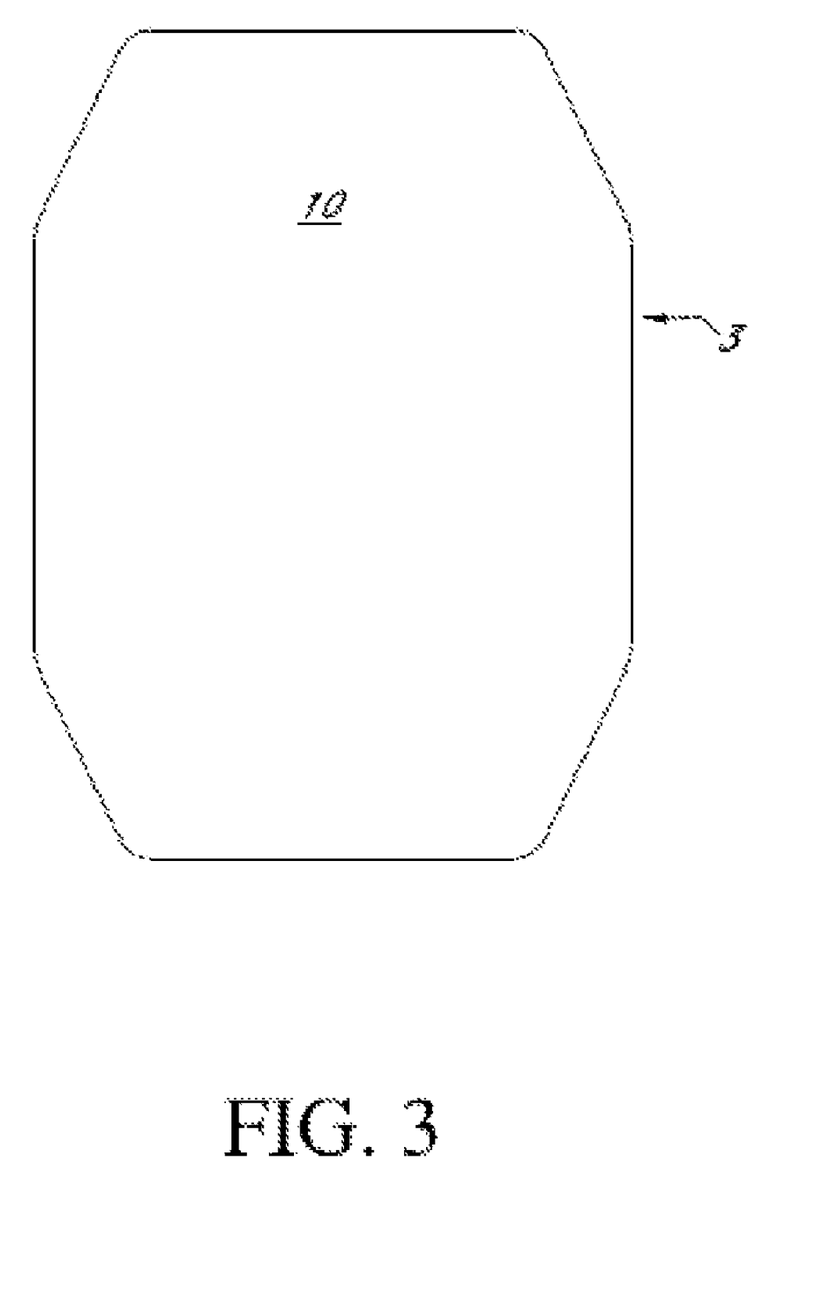
FIG. 3 illustrates the general shape of the automobile covering system from the top.

FIG. 3 illustrates the general shape of the automobile covering system from the top. In the preferred embodiment, the automobile covering system is produced with a general length of 18 feet and an exterior width of 13 feet. To improve "fit" the cover has a unique oval shape that incorporates a wide radius at all corners. As shown, the radius at the corners is 18 inches. The interior width is 11 feet. This shape resembles a squared oval having symmetrical features. Applicant has sound this shape improves cover to automobile fit thereby promoting an effective seal to improve the automobile covers imperviousness to rain, dust, dirt and other foreign objects.

FIG. 4 shows how the automobile cover 10 may be applied by the user to allow engagement and enclosure of the automobile 1. Such application is generally carried out by the user grasping the automobile cover 10 with one hand at a first skirt portion and with the other hand grasping the automobile cover at a second skirt portion thereafter the user moving his or her hands opposite and outwardly to fully dilate the elastic periphery region and engage the automobile 1. The automobile cover 10 is then placed around the automobile 1 and the user then releases the first and second skirt portions. The elastic periphery region, being in tension around the periphery of the automobile, creates a snug fit wherein the elastic periphery region is in firm contact with the automobile body.

Although not shown, one of ordinary skill will appreciate the outer surface of the flexible sheet 5 will support placement of a logo or a user's name. It should be readily understood by those skilled in the art that one or more logos may be located on any surface of the automobile cover. While the disclosure is susceptible to various modifications and alternative constructions, certain illustrative embodiments thereof have been shown in the drawings and pictures will be described below in detail. It should be understood, however, that there is no intention to limit the disclosure to the specific forms disclosed, but on the contrary, the intention is to cover all modifications, alternative constructions, and equivalents falling within the spirit and scope of the disclosure as defined by the appended claims.

The invention claimed is:

1. A method for protecting the exterior of an automobile, said method comprising the steps of:

a. expanding an automobile cover from a first state to a second state, wherein the exposed surface area of said automobile cover in said first state is minimized, and wherein the exposed surface area of said automobile cover in said second state is at least large enough to cover the exterior of a full-sized automobile;

b. arranging said automobile cover about the exterior of an automobile such that a flexible film cover portion of said automobile cover is positioned adjacent substantially the entire exterior of said automobile; and c. positioning the periphery of said automobile cover toward the bottom of said automobile such that a sealing portion of said automobile cover is located adjacent substantially the entire exterior of said automobile;

d. bunching an excess amount of said automobile cover together; and e. securing said excess amount of said automobile cover to an adjacent portion of said automobile cover by pressing an adhesive element disposed on the periphery of said automobile cover to said excess amount.

2. The method according to claim 1 wherein said flexible film cover portion of said automobile cover is further defined as having a thickness between 0.25 and 1.5 millimeters.

3. The method according to claim 2 wherein said automobile cover is further defined as including an elastic band around the periphery of said automobile cover.

4. The method according to claim 1 wherein said method further comprises removing said automobile cover after use and subsequently discarding said automobile cover.

5. The method according to claim 1 wherein said method further comprises removing a protective coating from said adhesive element placed on said automobile cover prior to the securing step.

* * * * *

UNITED STATES PATENT AND TRADEMARK OFFICE
CERTIFICATE OF CORRECTION

PATENT NO.        : 8,091,947 B1                                             Page 1 of 1
APPLICATION NO.   : 12/987237
DATED             : January 10, 2012
INVENTOR(S)       : Dennis L. Miller It is certified that error appears in the above-identified patent and that said Letters Patent is hereby corrected as shown below:

The issued patent states that application No. 12/039,734, filed Feb. 28, 2008 is now abandoned which is incorrect. It issued as patent No. 7,963,581 on Jun. 21, 2011. Please correct related application data and cross reference data as indicated below:

Patent Title page: RELATED U.S. APPLICATION DATA should read:
Continuation of application No. 12/726,983, filed on Mar. 18, 2010, now abandoned, which is a continuation of application No. 12/039,734, filed Feb. 28, 2008, now patent No. 7,963,581 issued Jun. 21, 2011.

Patent Column 1: CROSS REFERENCE TO RELATED APPLICATIONS should read:
This application claims priority from and is a continuation of U.S. application Ser. No. 12/726,983, filed Mar. 18, 2010, now abandoned, which was a continuation of and claimed priority from U.S. patent application Ser. No. 12/039,734, filed Feb. 28, 2008, now patent No. 7,963,581 issued Jun. 21, 2011 which claimed priority from provisional US Pat. App. Serial No. 60,903,913 filed on February 28, 2007, all of which are incorporated by reference herein in their entireties.

Signed and Sealed this
Seventeenth Day of July, 2012

David J. Kappos
*Director of the United States Patent and Trademark Office*